United States Patent
Matsumoto et al.

(10) Patent No.: US 7,536,707 B2
(45) Date of Patent: May 19, 2009

(54) VISUAL COMMUNICATIONS SYSTEM AND METHOD OF CONTROLLING THE SAME

(75) Inventors: Yuichi Matsumoto, Fujisawa (JP);
Takashi Yamamoto, Yamato (JP);
Masaki Kutsuna, Toyota (JP); Shigeki Mori, Koshiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 841 days.

(21) Appl. No.: 11/004,956

(22) Filed: Dec. 7, 2004

(65) Prior Publication Data
US 2005/0166242 A1 Jul. 28, 2005

(30) Foreign Application Priority Data
Dec. 15, 2003 (JP) ............................. 2003-416732

(51) Int. Cl.
H04N 5/76 (2006.01)
H04N 5/91 (2006.01)
H04N 7/18 (2006.01)

(52) U.S. Cl. .......................... 725/131; 725/80; 725/110; 348/14.01; 386/68

(58) Field of Classification Search .............. 379/93.21, 379/202.01–206.01; 348/14.08–14.1
See application file for complete search history.

(56) References Cited

U.S. PATENT DOCUMENTS

| 5,684,526 A | 11/1997 | Yoshinobu | 348/13 |
| 5,757,798 A | 5/1998 | Hamaguchi | 370/397 |
| 5,808,662 A * | 9/1998 | Kinney et al. | 348/14.1 |
| 7,269,338 B2 * | 9/2007 | Janevski | 386/96 |
| 7,295,548 B2 * | 11/2007 | Blank et al. | 370/352 |
| 7,453,488 B2 * | 11/2008 | Parker et al. | 348/14.08 |
| 2002/0063797 A1 | 5/2002 | Aratani et al. | 348/553 |
| 2002/0112244 A1 * | 8/2002 | Liou et al. | 725/93 |
| 2002/0138829 A1 | 9/2002 | Matsumoto et al. | 725/14 |
| 2003/0002849 A1 * | 1/2003 | Lord | 386/46 |
| 2003/0033603 A1 | 2/2003 | Mori et al. | 725/46 |
| 2003/0041108 A1 * | 2/2003 | Henrick et al. | 709/205 |
| 2003/0088875 A1 * | 5/2003 | Gay et al. | 725/88 |

(Continued)

FOREIGN PATENT DOCUMENTS

JP H7-245594 9/1995

(Continued)

Primary Examiner—Andrew Y Koenig
Assistant Examiner—Carmine Malangone
(74) Attorney, Agent, or Firm—Fitzpatrick, Cella, Harper & Scinto

(57) ABSTRACT

A visual communications system and a method of controlling the same for pausing the screens of two terminals at quite the same image. Video communications terminals receive the same channel in their respective broadcast program receiving units. A first video communications terminal temporarily stores the video of the received channel in the temporary storage memory. When a user pauses operation of the first terminal, it temporarily stores a screen pause time obtained by adding a predetermined time to the current time, and transmits a screen pause command and the screen pause time to a second video communications terminal. The second terminal pauses the video at the screen pause time if possible in time. Otherwise, it pauses the video immediately, and transmits a response with its own image pause time to the first terminal. The first terminal displays an image corresponding to the image pause time of the second terminal memory.

8 Claims, 9 Drawing Sheets

U.S. PATENT DOCUMENTS

| | | | |
|---|---|---|---|
| 2003/0142236 A1 | 7/2003 | Aratani et al. | 348/554 |
| 2004/0049788 A1 | 3/2004 | Mori et al. | 725/58 |
| 2004/0068746 A1 | 4/2004 | Mori et al. | 725/88 |
| 2004/0078472 A1 | 4/2004 | Mizutome et al. | 709/227 |
| 2004/0117830 A1 | 6/2004 | Ohno et al. | 725/51 |
| 2004/0148629 A1 | 7/2004 | Shibamiya et al. | 725/53 |
| 2004/0158859 A1 | 8/2004 | Aoyama et al. | 725/45 |
| 2004/0179811 A1 | 9/2004 | Kikkawa et al. | 386/46 |
| 2004/0261136 A1 | 12/2004 | Aratani et al. | 725/151 |
| 2005/0122391 A1 | 6/2005 | Fukuda et al. | 348/14.1 |
| 2005/0128351 A1 | 6/2005 | Yamamoto et al. | 348/473 |
| 2005/0130613 A1 | 6/2005 | Kutsuna et al. | 455/179.1 |
| 2005/0166242 A1 | 7/2005 | Matsumoto et al. | 725/100 |

FOREIGN PATENT DOCUMENTS

| | | |
|---|---|---|
| JP | 8-032601 | 2/1996 |
| JP | 2001-203982 | 7/2001 |
| JP | 2002-27413 | 1/2002 |
| JP | 2003-244600 | 8/2003 |

* cited by examiner

VISUAL COMMUNICATIONS SYSTEM AND METHOD OF CONTROLLING THE SAME

BACKGROUND OF THE INVENTION

1. Field of the Invention

The present invention relates to a visual communications system comprising communications terminals connected via a network and a method of controlling the same.

2. Description of the Related Art

There has been suggested an interactive-network, simultaneous-viewing system enabling a user to view the same TV program or the same video content as another party by using a TV phone or the like, while enjoying a conversation about the movie or the program they are viewing.

In this regard, transferring a control command requires a certain amount of time and therefore, if one party pauses the content while viewing the same content as the other party by using the TV phone or the like, both parties cannot pause the content at quite the same position.

Japanese Laid-Open Patent Publication (Kokai) No. H7-245594 (1995-245594), corresponding to U.S. Pat. No. 5,684,526, discloses an arrangement in which time information about a user's responding operation is added and sent to a destination over a telephone line regarding a responding operation to a program, so that the destination can accurately identify the responding operation time of a plurality of users. The arrangement, however, does not resolve the above problem.

If a pause occurs near a scene boundary of the content, the content may pause before switching scenes for the one party, but pause after switching scenes for the other party. In this situation, the images displayed on their screens will be quite different from each other, which may cause theme confusion in their conversation about the program or the paused scene.

Furthermore, when playing back content recorded in a recording medium, playback timings may be different between the devices since a period of time needed for the playback varies with the devices. This may cause a situation where they are talking about different parts of the content while viewing the same content.

It is an object of the present invention to provide a controller and a video playback unit to eliminate these disadvantages.

SUMMARY OF THE INVENTION

According to one aspect of the present invention, there is provided a visual communications system, including a plurality of communications terminals connected via a network. Each of the communications terminals includes a broadcast receiving unit for receiving a broadcast wave and outputting video data and a control unit for enabling an image display based on the video data. The control unit enables a display of the same static image as one displayed in another of the connected communications terminals in response to a user's screen pause operation.

According to another aspect of the present invention, a visual communications system includes a plurality of communications terminals connected via a network and video playback units connected to the communications terminals, respectively. Each of the communications terminals includes a control unit for enabling an image display based on video data output from the video playback unit. The control unit enables a display of the same image as one displayed in another of the connected communications terminals in response to a user's playback operation.

Another aspect of the present invention is directed to a method of controlling a visual communications system that has a plurality of communications terminals connected via a network. The method includes the steps of: receiving a broadcast wave in one of the communications terminals and outputting video data therefrom; enabling an image display based on the video data; and enabling a display of the same static image as one displayed in another of the connected communications terminals in response to a user's screen pause operation.

A further aspect of the present invention is directed to a method of controlling a visual communications system including a plurality of communications terminals connected via a network and video playback units connected to the communications terminals, respectively. The method includes the steps of: enabling an image display based on video data output from the video playback unit in one of the communications terminals; and enabling a display of the same image as one displayed in another of the connected communications terminals in response to a user's playback operation.

Another aspect of the present invention is directed to a computer-readable computer program prepared for causing the computer to execute the aforementioned method of controlling the visual communications system.

Therefore, according to the present invention, a plurality of users can pause the video playback at quite the same position. Even if the playback is paused near a scene boundary of the content, the plurality of users can view the same image. Thereby, the users can enjoy a conversation about quite the same image while viewing that image.

Even through tape media or disk media, the same image is played back and displayed on each of the media after releasing the pause and the users can enjoy a conversation about the same image while viewing the image.

BRIEF DESCRIPTION OF THE DRAWINGS

FIG. 7 is an illustration of an operation between a terminal 100a and a terminal 300a.

FIG. 8 is another illustration of an operation between the terminal 100a and the terminal 300a.

DESCRIPTION OF THE PREFERRED EMBODIMENTS

Preferred embodiments of the present invention will be described in detail in accordance with the accompanying drawings.

First Embodiment

Figure 1:
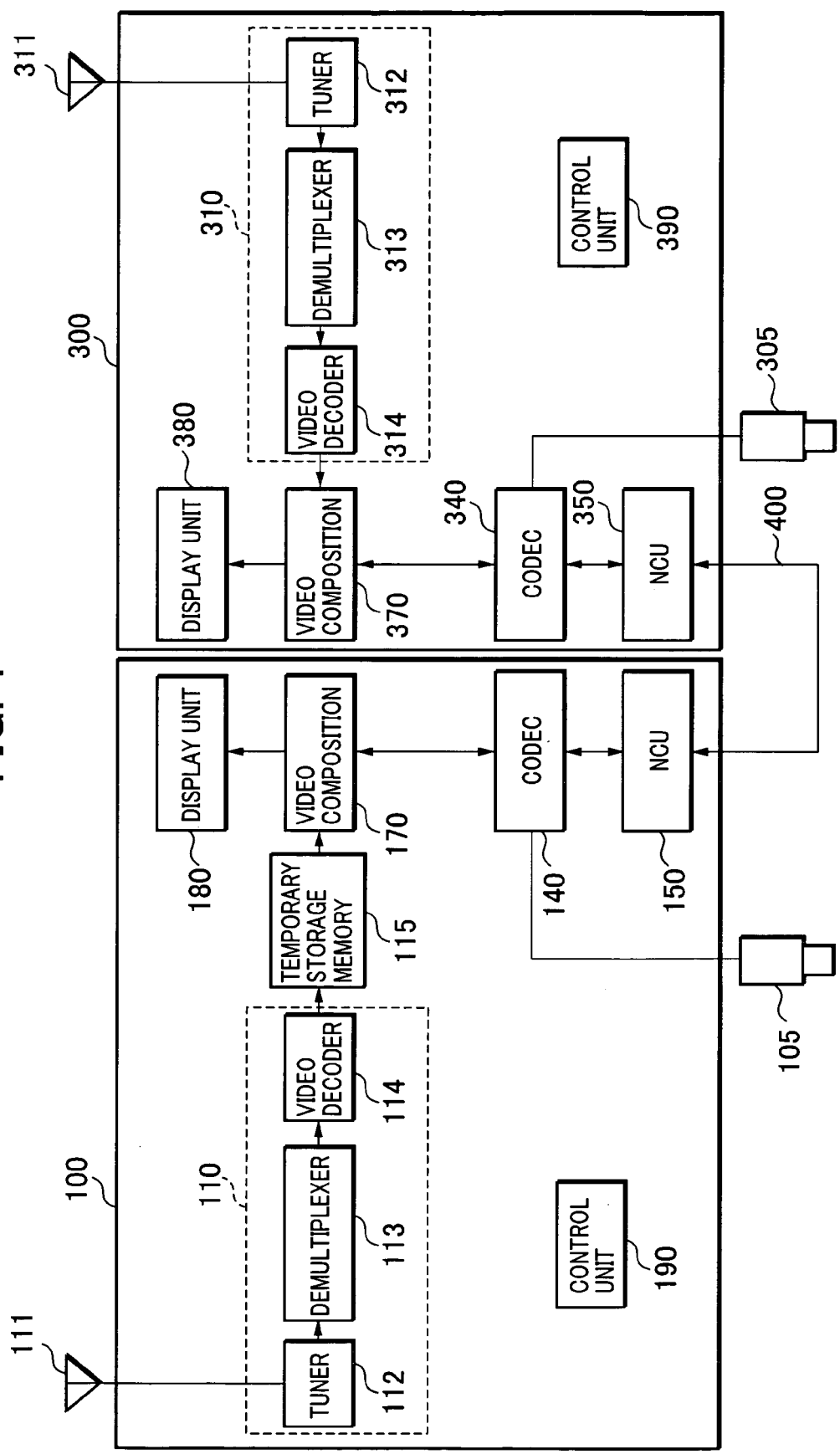
FIG. 1 is an outline block diagram of a first embodiment of the present invention.

Referring to FIG. 1, there is shown an outline block diagram of a first embodiment of the present invention. A user A uses a video communications terminal 100 as communications terminal equipment and a user B uses a video communications terminal 300. Television cameras 105 and 305 are for use in shooting video of the users A and B, respectively. Although the video communications terminal 100 and the video communications terminal 300 have the same configuration and functions, the video communications terminal 100 is assumed here to initiate the operation. The configuration and functions of the video communications terminals 100 and 300 will be described below.

A broadcast program receiving unit 110 has the same configuration as a general digital television. A tuner 112 receives a signal from an antenna 111, demodulates the received data and corrects any error, and outputs transport stream (TS) data. A demultiplexer 113 separates desired video data, audio data, and subtitle character information from TS data including time-division multiplexed data of video and audio data, subtitle character information, and electronic program data, or the like, of a plurality of channels. The separated video data is sent to a video decoder 114, and then decoded. The audio data separated by the demultiplexer 113 is sent to an audio decoder (not shown), and then output to an audio output unit (not shown), such as, for example, a speaker.

A temporary storage memory 115 temporarily stores a plurality of frames of video data output from the video decoder 114. The video data output from the video decoder 114 is input to a video composition unit 170 via the temporary storage memory 115. The video data decoded by the video decoder 114 is displayed on a display unit 180 by the video composition unit 170. The video composition unit 170 is capable of displaying a static image on the display unit 180 based on the video from the temporary storage memory 115.

A CODEC 140 compresses and decompresses video and audio data. The CODEC 140 compresses output video of the television camera 105 and outputs it to a network control unit (NCU) 150. In addition, it decompresses the compressed video data input from the NCU 150. The NCU 150 controls connections on a communication line 400.

The communication line 400 is an ISDN, and the NCU 150 is configured so as to operate conforming to ITU H320 standard. Therefore, video output from the CODEC 140 or a CODEC 340 and other control commands or the like can be transferred on the communication line 400.

A control unit 190 appropriately controls blocks in the video communications terminal 100. For example, it changes a channel of the broadcast program receiving unit 110 according to an operation of a remote controller (not shown) or an operation unit (not shown). The control unit 190 further changes a channel of the broadcast program receiving unit 110 according to a control command received by the NCU 150.

The control unit 190 includes a microcomputer caused to perform processing by a computer program.

The configuration of the video communications terminal 300 used by user B is the same as that of the video communications terminal 100, except that it does not have a part corresponding to the temporary storage memory 115.

Specifically, the video communications terminal 300 includes a broadcast program receiving unit 310 having the same configuration as a general digital television. The broadcast program receiving unit 310 includes a tuner 312 that receives the signal from an antenna 311, demodulates the received data and corrects any error, and outputs transport stream (TS) data. Demultiplexer 313 in the broadcast program receiving unit 310 separates desired video data, audio data, and subtitle character information from TS data including time-division multiplexed data of video and audio data, subtitle character information, and electronic program data, or the like, of a plurality of channels. The separated video data is sent to a video decoder 314, and then decoded. The video data output from the video decoder 314 is input to a video composition unit 370 and displayed on a display unit 380 by the video composition unit 370. The video composition unit 370 is capable of displaying a static image on the display unit 380.

In a digital broadcast, generally a system clock reference (SCR) and a program clock reference (PCR) are broadcast, by which it is possible to obtain and correct time information. Therefore, the video communications terminal 100 and the video communications terminal 300 can obtain the same time and operate based on the same time.

The operation between the video communications terminals 100 and 300 will be described in detail below. It is assumed that a line connection is completed between the video communications terminals 100 and 300, using communication line 400, for example.

The user A is assumed to have selected a certain channel. The control unit 190 sets the channel as a receiving channel of the broadcast program receiving unit 110 and transmits a channel select command to the video communications terminal 300 via the CODEC 140 and the NCU 150. The control unit 390 of the video communications terminal 300 receives the channel select command via the NCU 350 and the CODEC 340. It then sets a receiving channel of the broadcast program receiving unit 310 to a channel specified by the channel select command, namely, a channel selected by the user A.

Figure 2:
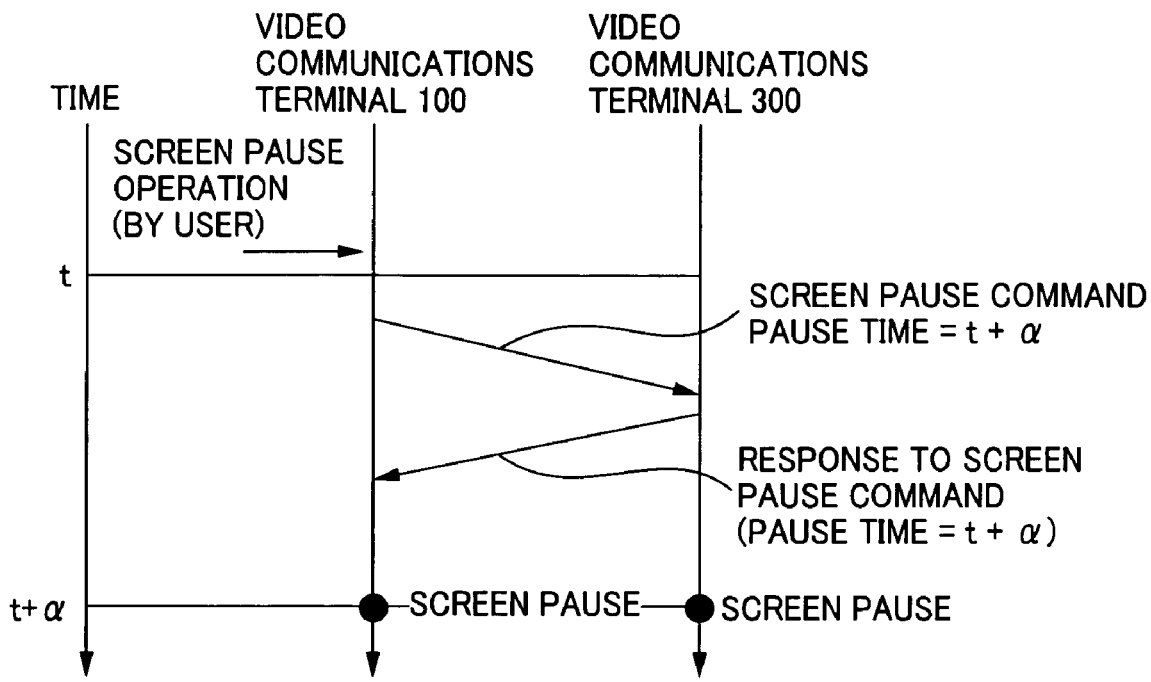
FIG. 2 is an illustration of an operation between a terminal 100 and a terminal 300 in case 1 of the first embodiment.

The video composition unit 170 combines an image of the television camera 305 received via the CODEC 340, the NCU 350, the NCU 150, and the CODEC 140 with an image from the broadcast program receiving unit 110 and displays the composite image on the display unit 180. FIG. 2 illustrates an example of the screen of the display unit 180 at that time. The video communications terminal 300 operates in the same manner and displays the same screen on display unit 380.

In this condition, the user A is assumed to have made an operation of pausing the screen. Thereupon, the control unit 190 of the video communications terminal 100 identifies the current time and temporarily stores the time obtained by adding a predetermined time to the current time as a screen pause time. Subsequently, the control unit 190 outputs a screen pause command and the temporarily stored screen pause time to the video communications terminal 300 via the CODEC 140 and the NCU 150. The control unit 390 of the video communications terminal 300 receives the screen pause command and the screen pause time via the NCU 350 and the CODEC 340.

The timing of the screen pause command gives rise to three cases. In the first case (case 1) the video communications terminal 300 receives the screen pause command before the screen pause time and the video communications terminal 100 receives a response to the screen pause command before the screen pause time. In the second case, the video communications terminal 300 receives the screen pause command before the screen pause time and the video communications terminal 100 receives a response to the screen pause command after the screen pause time. In the third case, the video communications terminal 300 receives the screen pause command after the screen pause time. Considering the processing time for the screen pause in the video communications terminal 300, the following case is treated in the same way as case 3: a case where a time period from the time when a reception of the screen pause command from the video communications terminal 100 is designated to the screen pause time designated by the screen pause command is shorter than the processing time for the screen pause in the video communications terminal 300.

FIG. 2 illustrates a communication between the video communications terminals 100 and 300 in case 1. The control unit 390 of the video communications terminal 300 has enough time until the received screen pause time and thus can pause the screen at the screen pause time. Therefore, it sends a response to the screen pause command to the video communications terminal 100 via the CODEC 340 and the NCU 350, together with the time when the screen is paused in the video communications terminal 300, namely, the received screen pause time. Then, at the screen pause time, the control unit 390 controls the video composition unit 370 to pause the screen. At the other side of the network, the video communications terminal 100 receives the response to the screen pause command and the screen pause time of the video communications terminal 300 and controls the video composition unit 170 to pause the screen at the received screen pause time.

As shown in FIG. 2, when the screen pause operation is executed by a user at video communications terminal 100 at time t, a screen pause command is transmitted to video communications terminal 300 instructing that video communications terminal 300 pause the screen of display unit 380 at a time equal to t+α. That screen pause command is received at video communications terminal 300 after time t and before time t+α. Video communications terminal 300 then sends a response to video communications terminal 100 confirming that video communications terminal 300 will pause the display at time t+α. As illustrated in FIG. 2, video communications terminal 100 receives the response from video communications terminal 300 before time t+α. Then, at time t+α, both video communications terminals 100 and 300 pause the screen in their respective display units at time t+α.

Accordingly, the video communications terminals 100 and 300 can pause the screens at quite the same image. Therefore, even if the pause occurs near a scene boundary of the content, the same image is displayed on both screens. Therefore, the users A and B can enjoy a conversation about the same image while viewing that image.

Figure 3:
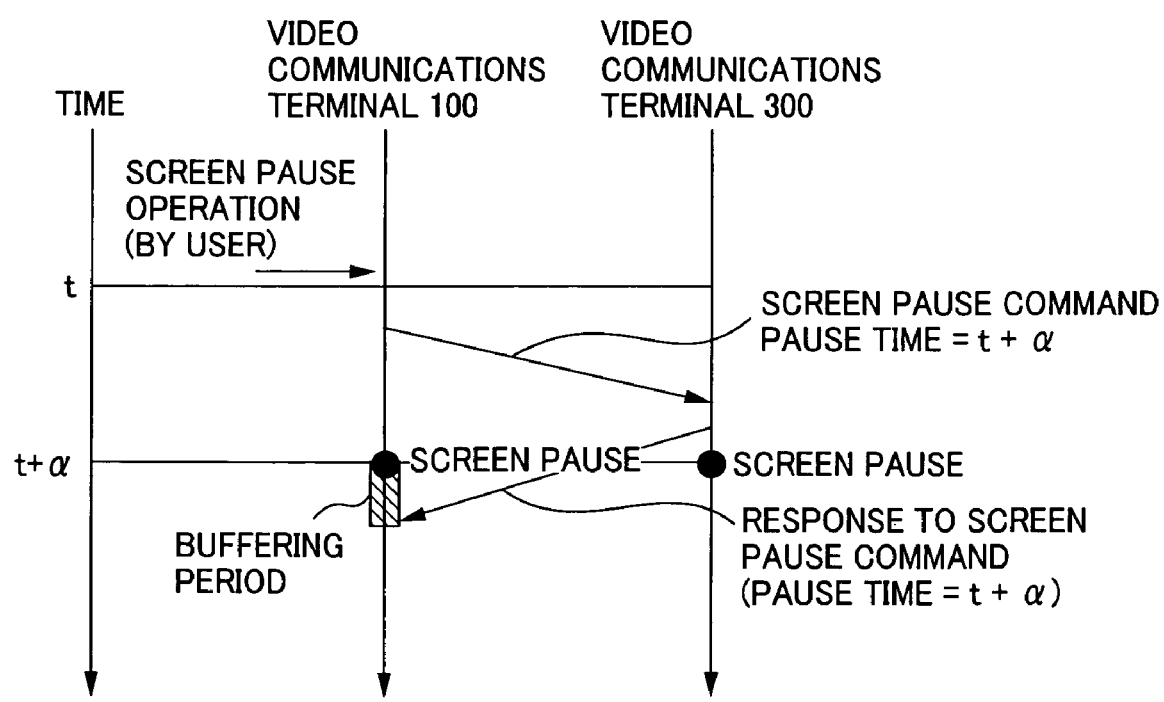
FIG. 3 is an illustration of an operation between the terminal 100 and the terminal 300 in case 2 of the first embodiment.

FIG. 3 illustrates a communication between the video communications terminals 100 and 300 in case 2. An operation of the video communications terminal 300 in this case is the same as in case 1.

In case 2, the user executes a screen pause operation at video communications terminal 100 at time t. The screen pause command instructs video communications terminal 300 to pause at time t+α. The command reaches video communications terminal 300 before time t+α, and terminal 300 pauses the screen of display unit 380 at t+α. However, the response by video communications terminal 300 to the screen pause command does not reach video communications terminal 100 until after time t+α.

In case 2, since the video communications terminal 100 did not receive a response to the screen pause command by the screen pause time of t+α, it controlled the video composition unit 170 to pause the screen at the screen pause time, and began storing video data subsequent to the screen pause time from the video decoder 114 into the temporary storage memory 115. Thereafter, when the video communications terminal 100 received a response to the screen pause command and a screen pause time of t+α from the video communications terminal 300. The video communications terminal 100, however, does nothing at that time since the received screen pause time of t+α is the same as the time when it paused its own screen.

Accordingly, the video communications terminals 100 and 300 can pause the screens at quite the same image, thereby achieving the same effect as in case 1.

Figure 4:
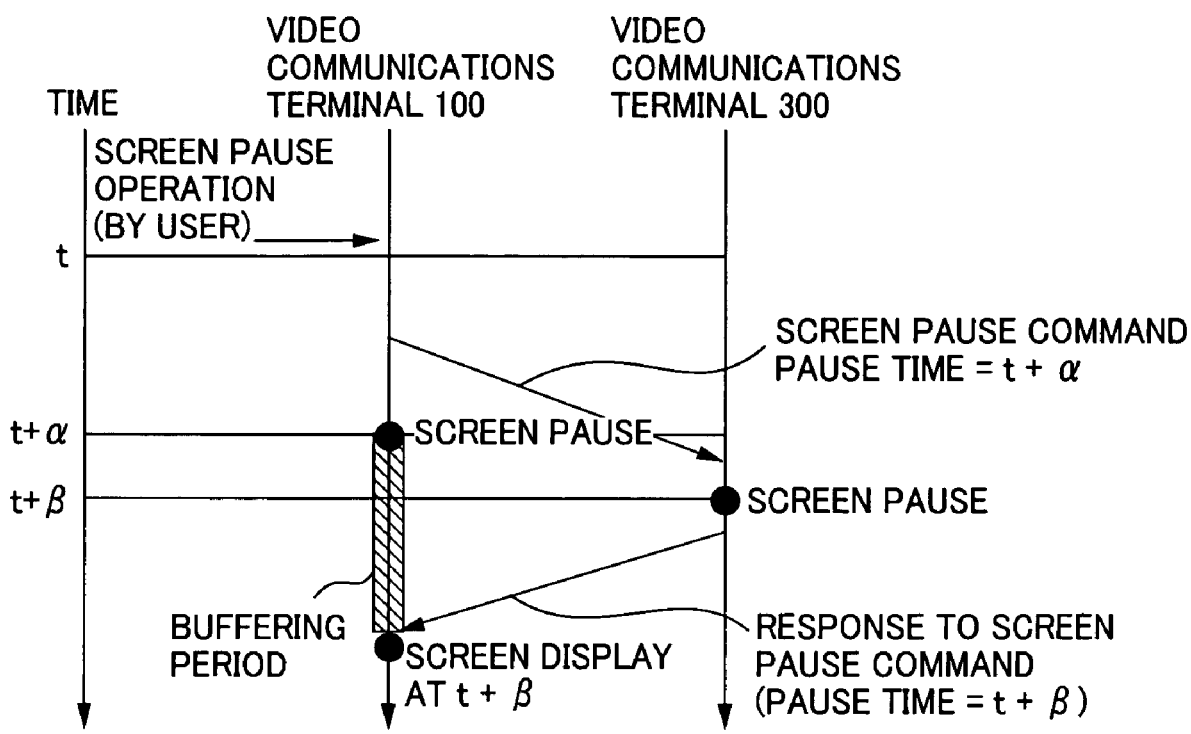
FIG. 4 is an illustration of an operation between the terminal 100 and the terminal 300 in case 3 of the first embodiment.

FIG. 4 illustrates a communication between the video communications terminals 100 and 300 in case 3. In case 3, the user executes the screen pause operation at time t at video communications terminal 100, instructing video communications terminal 300 to pause at time t+α. However, video communications terminal 300 does not receive the screen pause command until after time t+α. At time t+β, which is later than time t+α, video communications terminal 300 pauses the screen of display unit 380. Since video communications terminal 100 did not receive a response from video communications terminal 300 by time t+α, at time t+α, video communications terminal 100 paused the screen of display unit 180, and began storing video information. After pausing the screen of display unit 380 at time t+β, video communications terminal 300 responds to the screen pause command and provides its pause time of t+β to video communications terminal 100. In case 3, the control unit 390 of the video communications terminal 300 immediately pauses the screen at time t+β since the received screen pause time is past the current time. Then, the control unit 390 outputs a response to the screen pause command to the video communications terminal 100 via the CODEC 340 and the NCU 350, together with the time t+β when the video communications terminal 300 paused its own screen.

The video communications terminal 100 receives the response to the screen pause command and the screen pause time of the video communications terminal 300 after the screen pause time t+α temporarily stored. At time t+α, the video communications terminal 100 controls the video composition unit 170 to pause the screen and starts storing the image data from the video decoder 114 into the temporary storage memory 115. When terminal 300 receives the response to the screen pause command and the screen pause time t+β of the video communications terminal 300 from the video communications terminal 300, the control unit 190 controls the video composition unit 370 to cause the display unit 380 to display an image at the time corresponding to the screen pause time t+β of the video communications terminal 300 in the temporary storage memory 115.

Accordingly, the video communications terminals 100 and 300 can pause the screens at quite the same image in the same manner as for cases 1 and 2 and the same effects can be achieved as for cases 1 and 2.

Second Embodiment

Figure 5:
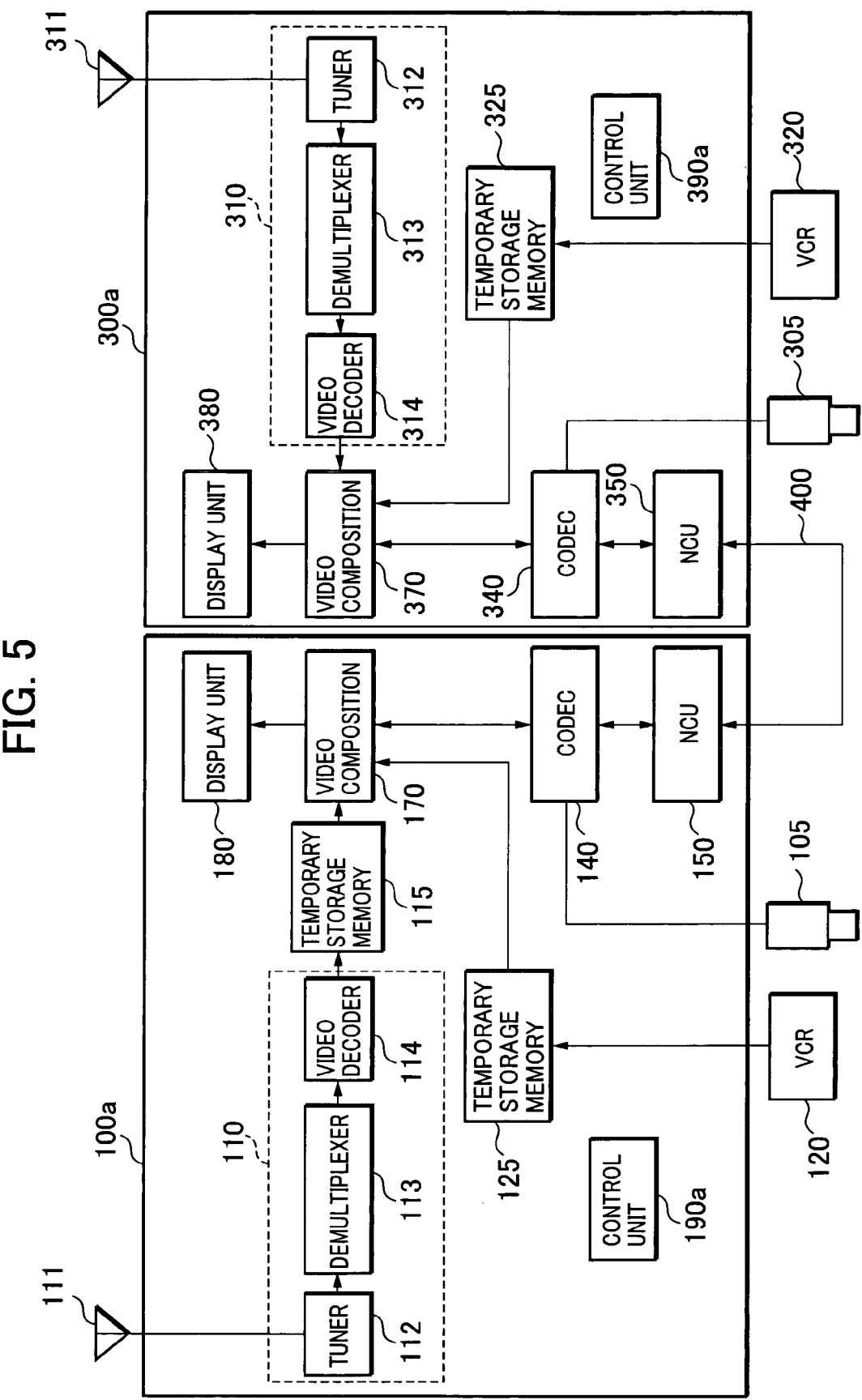
FIG. 5 is an outline block diagram of a second embodiment.

A second embodiment of the present invention will be described hereinafter. FIG. 5 shows an outline block diagram of the second embodiment. The same reference numerals have been retained for the same parts as those shown in FIG. 1.

A video communications terminal 100a has a function of controlling a video cassette recorder (VCR) 120 as a video playback unit to capture the played back video, in addition to the functions of the video communications terminal 100a. The VCR 120 plays back the content recorded on the cassette tape. A control unit 190a of the video communications terminal 100a can control the playback, stop, pause and other operations of the VCR 120. The video communications terminal 100a and the VCR 120 are connected via, for example, an IEEE 1394 serial bus standardized as the IEEE 1394-1995 standard by the Institute of Electrical and Electronics Engineers, Inc., the video and audio data are transferred as isochronous data, and a control command of the VCR 120 is transferred as asynchronous data. In the 1394 Trade Association (1394RA), a control command and a control method (protocol) for use in the IEEE 1394 serial bus are defined. For details, refer to "AV/C Digital Interface Command Set General Specification," "AV/C Digital Interface Command Set VCR Subunit Specification," or other written standards issued by the 1394TA.

The control command from the control unit 190*a* can be transmitted outside through the NCU 150. Furthermore, the control unit 190*a* controls the VCR 120 according to the control command received by the NCU 150. A temporary storage memory 125 temporarily stores video data output from the VCR 120 under the control of the control unit 190*a*.

A video communications terminal 300*a* controls a video cassette recorder (VCR) 320 and has a function of capturing its played back video, in addition to the function of the video communications terminal 300*a*. In other words, the video communications terminal 300*a* and the video communications terminal 100*a* have substantially the same functions. A temporary storage memory 325 temporarily stores video data output from the VCR 320 under the control of the control unit 390*a*.

The VCRs 120 and 320 are assumed to have cassette tapes having the same content recorded therein, respectively.

The operation between the video communications terminals 100*a* and 300*a* will be described below. It is assumed that a line connection is completed between the video communications terminals 100*a* and 300*a* by communication line 400.

The user A is assumed to have performed an operation for playing the VCR 120. Thereon, the control unit 190*a* controls the VCR 120 to be put into a playback state and transmits a playback command to the video communications terminal 300*a* via the CODEC 140 and the NCU 150. The control unit 390*a* of the video communications terminal 300*a* controls the VCR 320 to be put into the playback state according to the playback command received via the NCU 350 and the CODEC 340.

Figure 6:
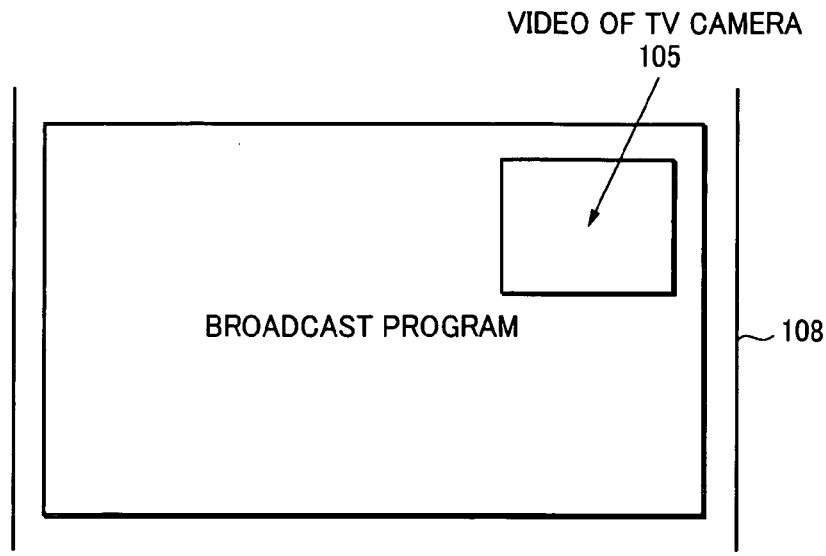
FIG. 6 is an illustration of a screen of a display unit 180.

A video composition unit 170 combines an image of a television camera 305 received via the CODEC 340, the NCU 350, the NCU 150, and the CODEC 140 with a played back image on the VCR 120 and displays the composite image on a display unit 180, in the same manner as in the illustrative screen shown in FIG. 6. The video communications terminal 300*a* operates similarly and displays the same image in a display unit 380 as in the illustrative screen in FIG. 6.

In this condition, the user A is assumed to have performed an operation of pausing the VCR 120. Thereupon, the control unit 190*a* controls the VCR 120 to be put into a pause state and identifies the position on the paused tape of the VCR 120. This operation can be performed using an absolute track number command of an AV/C command. Then, the control unit 190*a* transmits a pause command and a pause position of the VCR 120 to the video communications terminal 300*a* via the CODEC 140 and the NCU 150.

The control unit 390*a* of the video communications terminal 300*a* receives the pause command and the pause position via the NCU 350 and the CODEC 340 and pauses the VCR 320 at the pause position. It is enabled by the absolute track number command of the AV/C command.

Accordingly, the VCR 120 of the user A and the VCR 320 of the user B can be paused at quite the same position, thereby achieving the same effects as for the first embodiment.

While the pause position on the tape has been used in the above description, a frame ID can be used instead of the position on the tape in an arrangement where a frame ID is added to each frame in the content and the video communications terminals 100*a* and 300*a* are capable of identifying the frame ID.

The user A is then assumed to give an instruction of playing the VCR 120 during a pause of both terminals. Thereon, the control unit 190*a* of the video communications terminal 100*a* controls the VCR 120 to be put into a playback state and transmits a playback command to the video communications terminal 300 via the CODEC 140 and the NCU 150. When the VCR 120 starts to play back the video, the video communications terminal 100*a* transmits the playback start time to the video communications terminal 300*a*.

Upon receiving the playback command via the NCU 350 and the CODEC 340, the control unit 390*a* of the video communications terminal 300*a* controls the VCR 320 to be put into a playback state. Then, when the VCR 320 starts to play back the video, the terminal 300*a* transmits the playback start time to the video communications terminal 100*a*.

Figure 7:
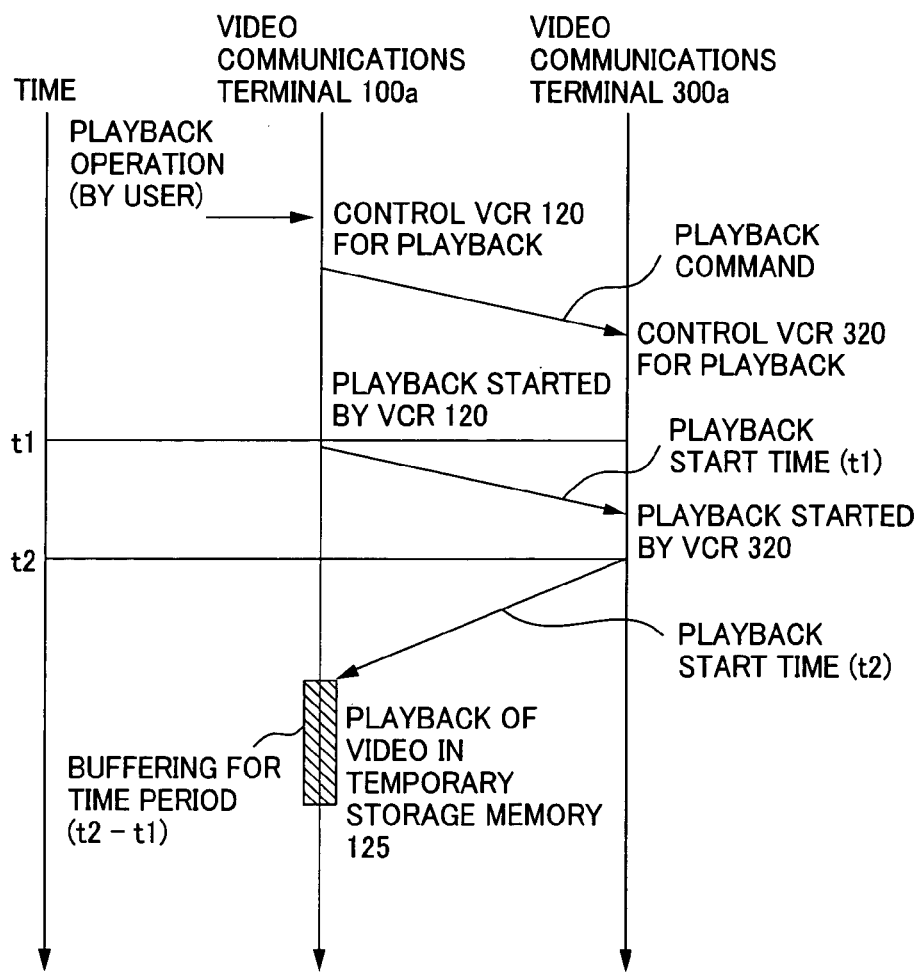

FIG. 7 illustrates a situation in which that t1 and t2 are the playback start time of the VCR 120 and the playback start time of the VCR 320, respectively, and t1 is earlier than t2 (t1<t2). The video communications terminal 100*a*, having the earlier playback start time, starts to store the video output from the VCR 120 into the temporary storage memory 125. After storing the video having a length equivalent to t2 minus t1 (t2−t1) into the temporary storage memory 125, it then starts to read a video signal from the temporary storage memory 125 to the video composition unit 170.

Figure 8:
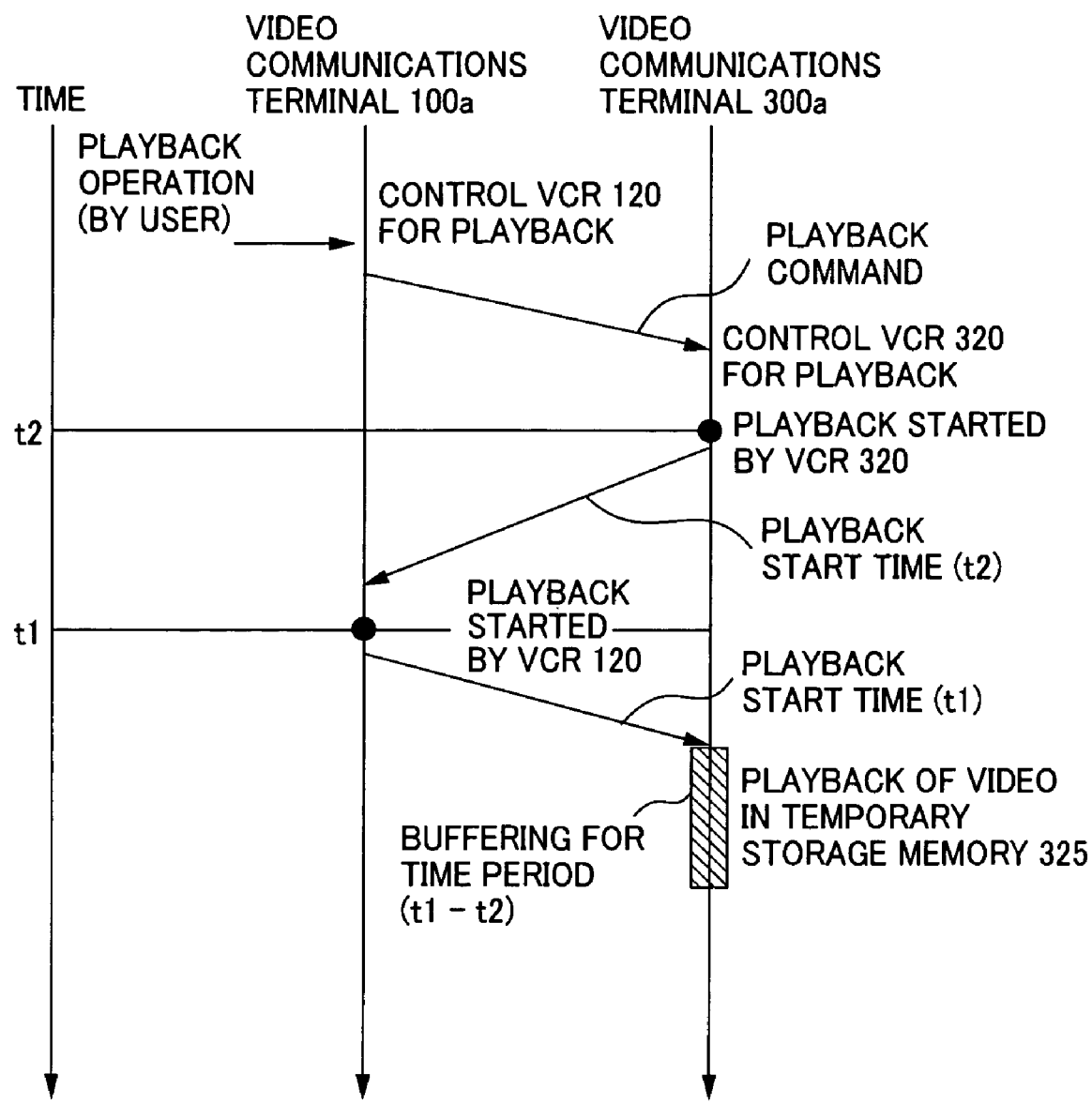

FIG. 8 illustrates a situation in which the VCR 320 starts the video playback earlier than the VCR 120, in other words, t1>t2. In this situation, the video communications terminal 300, having the earlier playback start time, starts to store the video output from the VCR 320 into the temporary storage memory 325. Then, after storing the video having a length equivalent to t1 minus t2 (t1−t2) into the temporary storage memory 325, it then starts to read a video signal from the temporary storage memory 325 to the video composition unit 370.

Accordingly, quite the same image can be displayed on the screens of the video communications terminals 100*a* and 300*a*.

In the above description, if the VCR 120 and the VCR 320 each have an apparatus having sufficiently quick response such as a hard disk storage unit, the video communications terminal 100*a* does not need the temporary storage memory 125, but it is only necessary to change (rewind) the playback position backward by the amount of time equivalent to the time "t2−t1." Alternatively, the video communications terminal 300 having the later playback start time may change (fast-forward) the playback position by the amount of time equivalent to the time "t2 −t1." The same is true of the video communications terminal 300*a*.

While the video communications terminal 100*a* and the video communications terminal 300*a* obtain the same time from the broadcast program receiving units 110 and 310 in this embodiment, the arrangement may be such that the video communications terminals 100*a* and the video communications terminal 300*a* obtain the same time from the JJY standard frequency broadcast managed by the Communications Research Laboratory.

Those skilled in the art will readily understand that the invention is not limited to VCR's, but may be used with other devices capable of recording and playing back video data, such as DVD players, CD ROM players, and the like.

Third Embodiment

Figure 9:
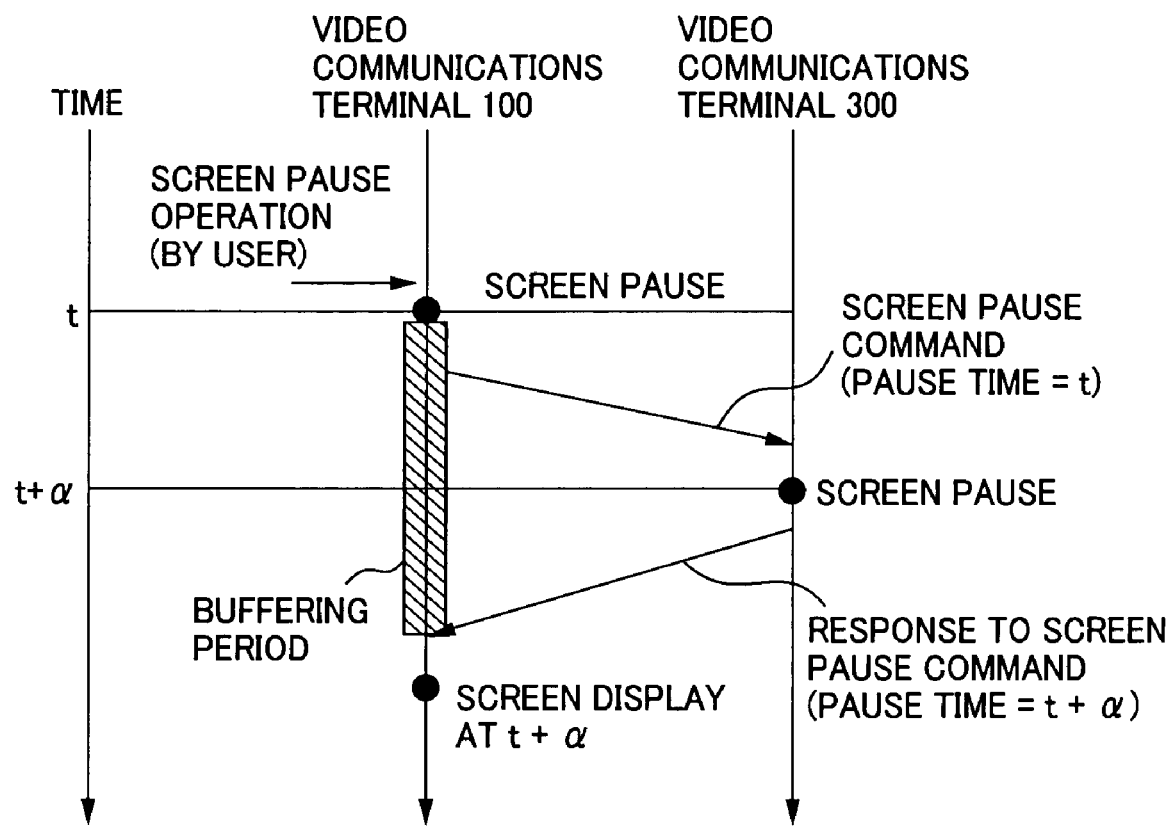
FIG. 9 is an illustration of an operation between the terminal 100 and the terminal 300 of a third embodiment.

FIG. 9 illustrates the operation of a third embodiment of the present invention which involves a change in operation from the first embodiment. Therefore, the following describes only the changes with reference to FIG. 9.

It is assumed that the user A performed a screen pause operation at time t. At that time, the control unit 190 controls the video composition unit 170 to pause the screen and transmits the screen pause command to the video communications terminal 300 via the CODEC 140 and the NCU 150. Then, the video communications terminal 100 awaits a response from the video communications terminal 300 and starts the temporary storage of the video data from the video decoder 114.

Upon receiving the screen pause command via the NCU 350 and the CODEC 340, the control unit 390 of the video communications terminal 300 controls the video composition unit 370 to pause the screen and identifies the current time of t+α. The video communications terminal 300 transmits the screen pause time of the video communications terminal 300, t+α, to the video communications terminal 100 via the CODEC 340 and the NCU 350, together with a response to the screen pause command.

Upon receiving the response to the screen pause command and the screen pause time of the video communications terminal 300 via the NCU 150 and the CODEC 140, the control unit 190 of the video communications terminal 100 controls the video composition unit 370 and displays the video at the time corresponding to the screen pause time of the video communications terminal 300, that is, time t+α, from the video data temporarily stored.

Accordingly, the video communications terminal 100 and the video communications terminal 300 can pause the screen at quite the same image, thereby achieving the same effects as for the first embodiment. Furthermore, in comparison with the first embodiment, the screen pauses in a shorter time from the screen pause operation of the user A of the video communications terminal 100 and therefore a convenient operating environment is available. Still further, in comparison with the second embodiment, the video communications terminal 100 need not temporarily store the screen pause time and it becomes unnecessary to compare it with the screen pause time of the video communications terminal 300, by which the operation is simplified.

Fourth Embodiment

Figure 10:
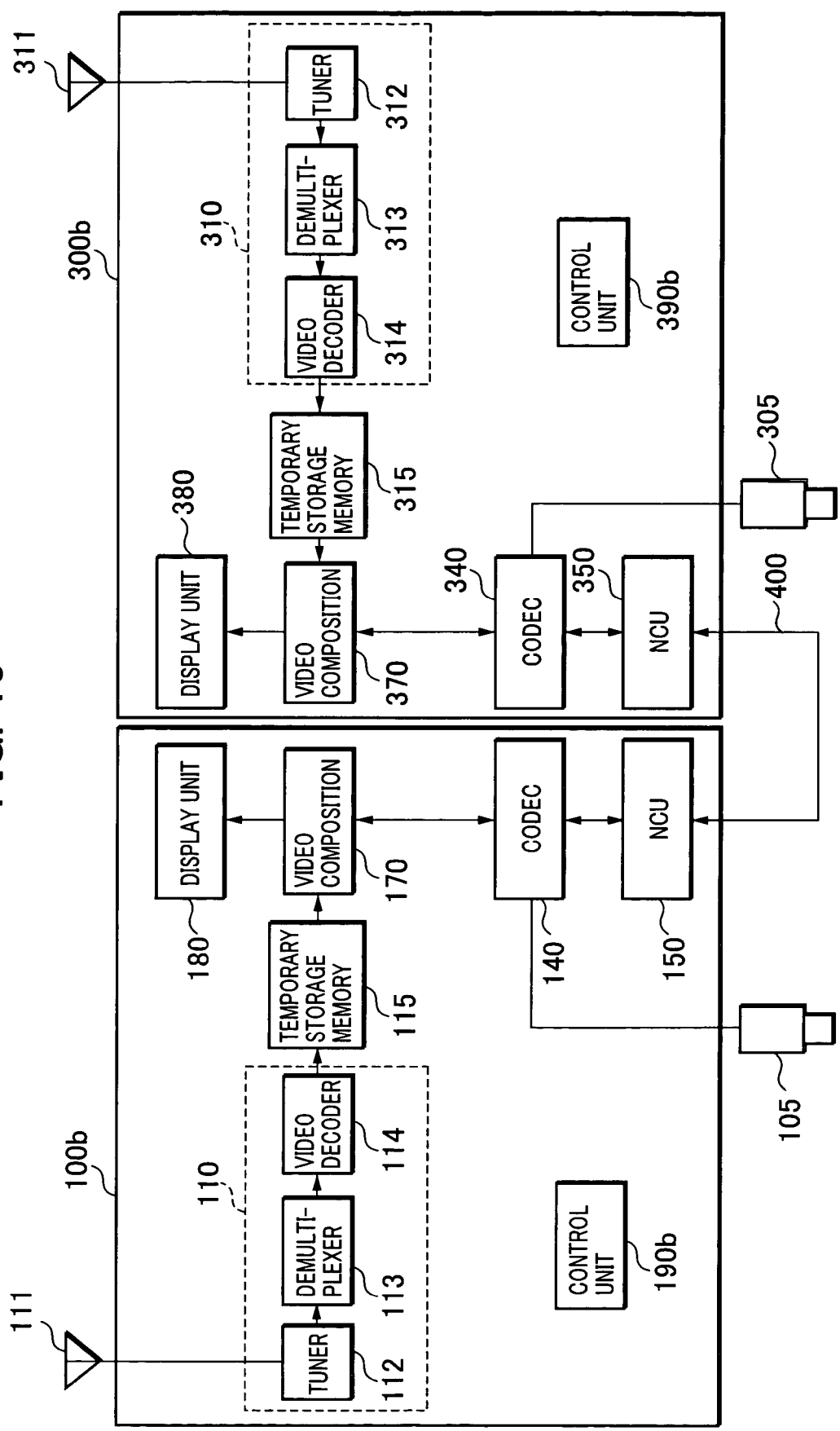
FIG. 10 is an outline block diagram of a fourth embodiment.

A fourth embodiment of the present invention will be described below. Referring to FIG. 10, there is shown an outline block diagram of the fourth embodiment. The fourth embodiment differs from the first embodiment in that a video communications terminal 300b also needs a temporary storage memory 315. The temporary storage memory 315 can store a number of frames of video data output from the video decoder 314. In this embodiment, the temporary storage memory 315 constantly contains temporarily stored video data output from the video decoder 314.

Figure 11:
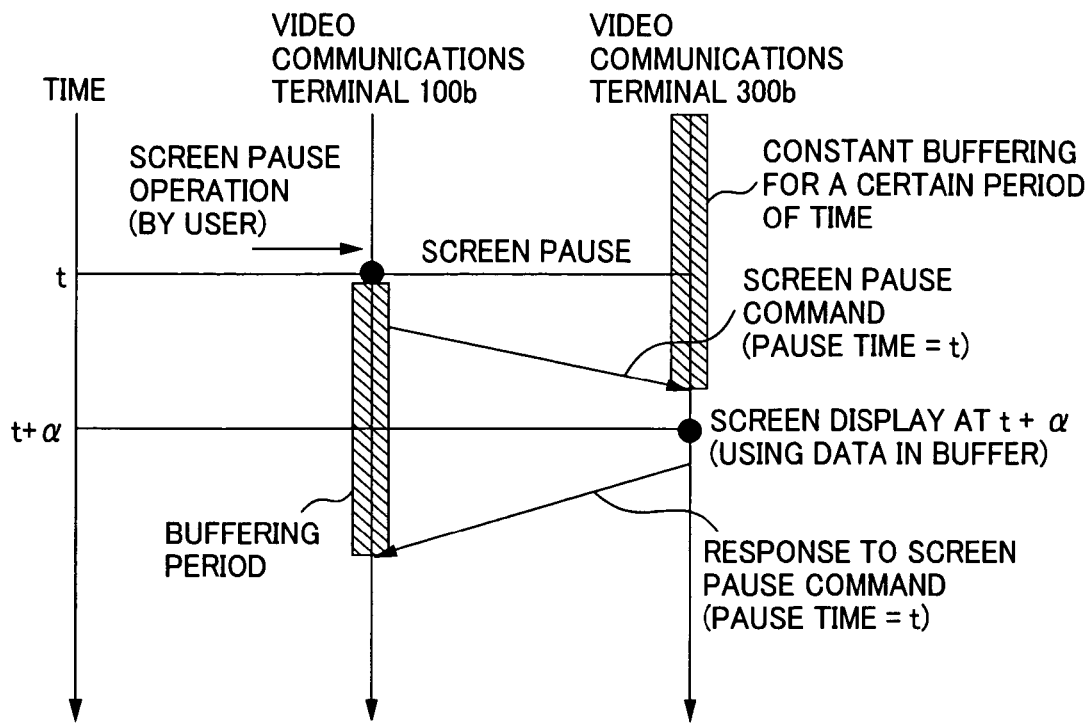
FIG. 11 is an illustration of an operation between a terminal 100b and a terminal 300b.

It is assumed that the user A performed a screen pause operation. An operation between the video communications terminals 100b and 300b is shown in FIG. 11.

According to the operation of the user A, a control unit 190b of a video communications terminal 100b identifies the current time and temporarily stores a time obtained by adding a predetermined time to the current time as a screen pause time t. Subsequently, the control unit 190b transmits a screen pause command, together with the screen pause time t, to the video communications terminal 300b via a CODEC 140 and an NCU 150. Then, the video communications terminal 100b awaits a response from the video communications terminal 300b and starts to temporarily store the output video data from the video decoder 114 into the temporary storage memory 115.

Upon receiving a screen pause command via the NCU 350 and the CODEC 340, the control unit 390b of the video communications terminal 300b controls the video composition unit 370 and reads and displays the image at the screen pause time t in the video stored in the temporary storage memory 315. The control unit 390b transmits a response to the screen pause command to the video communications terminal 100b via the CODEC 340 and the NCU 350, together with the screen pause time of the video communications terminal 300b, namely, the screen pause time t transmitted from the video communications terminal 100.

The video communications terminal 100b receives the response to the screen pause command and the screen pause time of the video communications terminal 390b from the video communications terminal 300b. Since the received screen pause time is the same as the screen pause time of the video communications terminal 100b, the video communications terminal 100b does nothing at that time.

Accordingly, the video communications terminal 100b and the video communications terminal 300b can pause the screens at quite the same image, thereby achieving the same effects as for the third embodiment. Furthermore, in comparison with the third embodiment, the screen can be paused in a shorter time from the screen pause operation of the user A and therefore a convenient operating environment is available.

Fifth Embodiment

Figure 12:
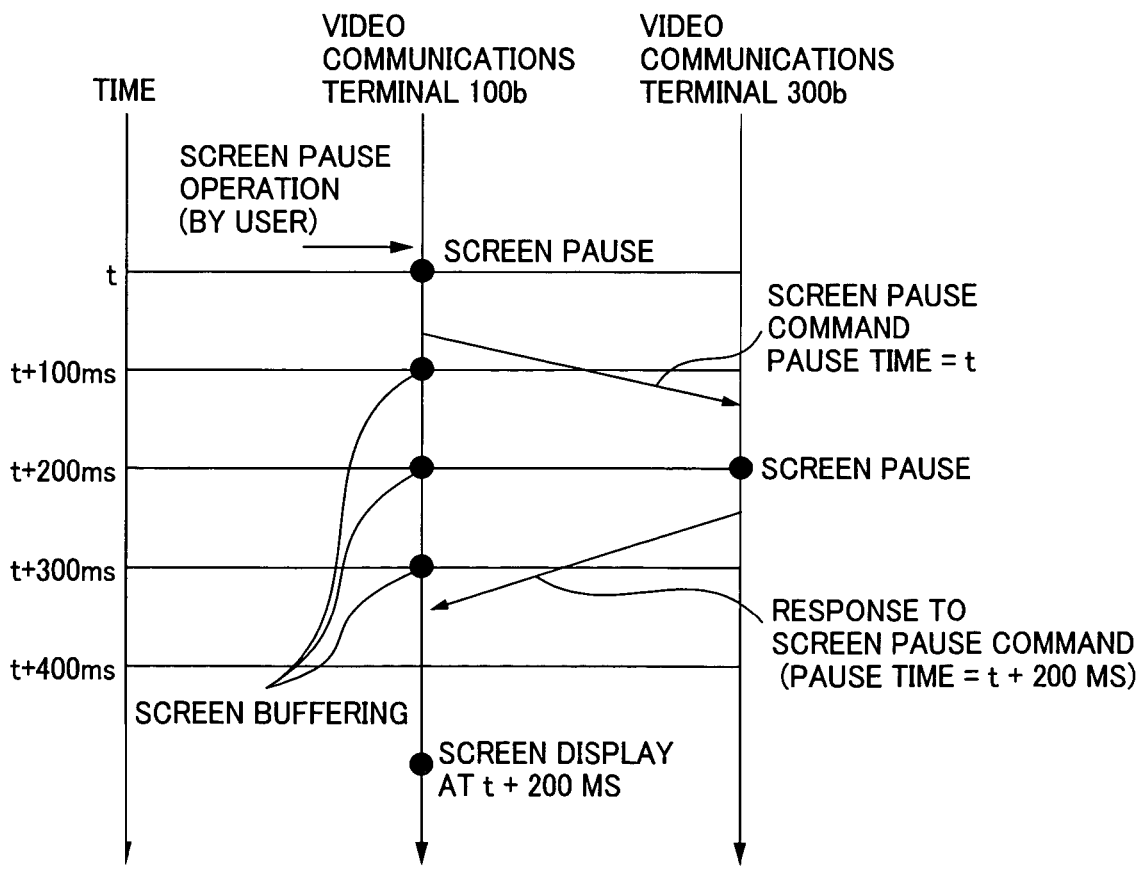
FIG. 12 is an illustration of an operation between the terminal 100 and the terminal 300 of a fifth embodiment.

FIG. 12 illustrates the operation of a fifth embodiment of the present invention. The configuration of the fifth embodiment is substantially the same as that of the third embodiment. The following describes changes from the third embodiment.

It is assumed that the user A performed a screen pause operation. An operation between the video communications terminals 100 and 300 is shown in FIG. 12.

According to this operation, a control unit 190 identifies the current time, pauses the screen, and transmits a screen pause command and the identified time to a video communications terminal 300 via a CODEC 140 and an NCU 150. Then, the video communications terminal 100 awaits a response from the video communications terminal 300 and stores video data from a video decoder 114 into a temporary storage memory 115 at regular time intervals (100 ms here). In this regard, the time interval 100 ms for the temporary storage into the temporary storage memory 115 is predetermined by agreement between the video communications terminal 100 and the video communications terminal 300.

A control unit 390 of a video communications terminal 300 receives the screen pause command and the time via an NCU 350 and a CODEC 340. At the current time corresponding to the received time plus an integral multiple of 100 ms, the control unit 390 controls the video composition unit 370 to pause the screen. It then transmits a response to the screen pause command to the video communications terminal 100 via the CODEC 340 and the NCU 350, together with the screen pause time of the video communications terminal 300.

Upon receiving the response to the screen pause command and the screen pause time of the video communications terminal 300 via the NCU 150 and the CODEC 140, the control unit 190 of the video communications terminal 100 controls the video composition unit 370 to read and display the image at the time corresponding to the screen pause time of the video communications terminal 300 from the video data stored in the temporary storage memory 115.

Accordingly, the video communications terminal 100 and the video communications terminal 300 can pause the screens at quite the same image, thereby achieving the same effects as for the first an third embodiments.

In the fifth embodiment, the temporary storage memory 115 requires less capacity than in the third embodiment, since video data from the video decoder 114 is stored at regular time intervals (100 ms here) from when the video communications terminal 100 outputs the screen pause command to the video communications terminal 300 until it receives the response to the screen pause command.

Although the time intervals for the temporary storage of the video data from the video decoder 114 into the temporary storage memory 115 are predetermined with an agreement between the video communications terminal 100 and the video communications terminal 300 in this embodiment, the predetermination becomes unnecessary by adding it to the screen pause command. The arrangement may be such that the screen pause command includes time information on the temporary storage such as, for example, the pause time t, t+75 ms, t+150 ms, t+225 ms, t+300 ms, and so on, and the video communications terminal 300, having received the time information, pauses the screen at the time corresponding to one of the time information.

Except as otherwise disclosed herein, the various components shown in outline or block form in the figures are individually well-known and their internal construction and operation are not critical either to the making or using of this invention or to a description of the best mode of the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications, equivalent structures and functions.

This application claims priority from Japanese Patent Application No. 2003-416732 filed Dec. 15, 2003, which is hereby incorporated by reference herein.

What is claimed is:

1. A controlling method of a communication terminal capable of displaying a video data and being communicably connected with another communication terminal capable of displaying a video data, said method comprising the steps of:
   accepting a user's operation to pause video display of the video data being displayed by the communication terminal and the another communication terminal;
   generating first screen pause time information after the operation to pause is accepted;
   controlling displaying a static image in which the video display is paused at a time based on the first screen pause time information;
   sending the first screen pause time information to the another communication terminal, wherein the first screen pause time information is sent from the communication terminal to the another communication terminal such that the another communication terminal and the communication terminal display the same static image; and
   receiving second screen pause time information to indicate the time when the video display of the video data being displayed by the another communication terminal is paused based on the first screen pause time information,
   wherein said controlling step displays a static image corresponding to either one of times based on the first screen pause time information and the second screen pause time information.

2. A method according to claim 1, wherein said controlling step displays a static image corresponding to the time of the second screen pause time information when the time of the second screen pause time information is later than the time of the first screen pause time information.

3. A method according to claim 1, wherein the communication terminal comprises a memory unit for storing video data, and
   wherein said controlling step controls stores the video data into the memory unit from a time corresponding to the first screen pause time information.

4. A method according to claim 3, wherein said controlling step does not store the video data into the memory unit when the second screen pause time information is received by the time corresponding to the first screen pause time information.

5. A communication terminal capable of displaying video data and being communicably connected with another communication terminal capable of displaying a video data, comprising:
   an accepting unit for accepting a user's operation to pause video display of the video data being displayed by said communication terminal and the another communication terminal;
   a generating unit for generating first screen pause time information after the operation to pause is accepted;
   a control unit for controlling displaying of a static image in which the video display is paused at a time based on the first screen pause time information;
   a sending unit for sending the first screen pause time information to the another communication terminal, wherein the first screen pause time information is sent from said communication terminal to the another communication terminal such that the another communication terminal and said communication terminal display the same static image; and
   a receiving unit for receiving second screen pause time information to indicate a time when the video display of the video data being displayed by the another communication terminal is paused based on the first screen pause time information,
   wherein said control unit displays a static image corresponding to either one of times based on the first screen pause time information and the second screen pause time information.

6. A communication terminal according to claim 5, wherein said control unit displays the static image corresponding to the time of said second screen pause time information when the time of the second screen pause time information is later than the time of the first screen pause time information.

7. A communication terminal according to claim 5, further comprising a memory unit for storing video data,
   wherein said control unit controls storing the video data into said memory unit from a time corresponding to the first screen pause time information.

8. A communication terminal according to claim 7, wherein said control unit does not store the video data into said memory unit when the second screen pause time information is received by the time corresponding to the first screen pause time information.

* * * * *